United States Patent
Pachciarz et al.

(10) Patent No.: US 7,064,525 B2
(45) Date of Patent: Jun. 20, 2006

(54) METHOD FOR IMPROVED BATTERY STATE OF CHARGE

(75) Inventors: Mahlon Richard Pachciarz, Grand Blanc, MI (US); Robert D. Harris, Perry, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/039,290

(22) Filed: Jan. 19, 2005

(65) Prior Publication Data

US 2005/0189928 A1    Sep. 1, 2005

Related U.S. Application Data

(60) Provisional application No. 60/547,845, filed on Feb. 26, 2004.

(51) Int. Cl.
  *H02J 7/14*   (2006.01)
  *F16D 67/02*  (2006.01)
  *F02M 3/00*   (2006.01)
  *F02D 9/02*   (2006.01)

(52) U.S. Cl. .................. 322/28; 477/96; 477/111; 477/112; 123/339.1; 123/339.17; 123/339.18

(58) Field of Classification Search ............. 322/28
  See application file for complete search history.

(56) References Cited

U.S. PATENT DOCUMENTS

| | | | | |
|---|---|---|---|---|
| 4,113,077 A | * | 9/1978 | Phinney | 477/112 |
| 4,119,185 A | * | 10/1978 | Phinney | 477/96 |
| 4,424,477 A | | 1/1984 | Enoshima | 320/61 |
| 4,441,471 A | * | 4/1984 | Kratt et al. | 477/111 |
| 4,467,761 A | * | 8/1984 | Hasegawa | 123/327 |
| 4,491,108 A | * | 1/1985 | Hasegawa et al. | 123/339.16 |
| 4,527,112 A | * | 7/1985 | Herman | 322/38 |
| 4,649,878 A | * | 3/1987 | Otobe et al. | 123/339.18 |
| 5,402,007 A | | 3/1995 | Center | 290/40 B |
| 6,404,163 B1 | * | 6/2002 | Kapsokavathis et al. | 320/104 |
| 6,411,560 B1 | * | 6/2002 | Tanizaki et al. | 365/227 |
| 6,424,157 B1 | | 7/2002 | Gollomp | 324/430 |
| 6,483,277 B1 | * | 11/2002 | Harmon | 322/28 |
| 6,696,842 B1 | * | 2/2004 | Traub | 324/426 |
| 6,883,495 B1 | * | 4/2005 | Strauss | 123/339.1 |

* cited by examiner

*Primary Examiner*—Darren Schuberg
*Assistant Examiner*—Pedro J. Cuevas
(74) *Attorney, Agent, or Firm*—Paul L. Marshall

(57) ABSTRACT

A method for improving vehicle battery state-of-charge (SOC) for initial vehicle customer delivery is disclosed. The method is focused on vehicle assembly plant practices and ensuring that battery discharge is minimized or eliminated during the vehicle assembly process. The method includes determining the available maximum percentage of duty cycle voltage output from the vehicle alternator and determining a minimum idle boost speed necessary to provide minimum discharge or positive charge to the battery when the vehicle's accessories are in the "on" state during vehicle assembly. The method further includes programming the vehicle's controllers to force the maximum percentage of duty cycle voltage output available and the minimum idle speed necessary to provide minimum battery discharge or positive charge during the earliest part of the vehicle life.

8 Claims, 1 Drawing Sheet

METHOD FOR IMPROVED BATTERY STATE OF CHARGE

CROSS-REFERENCE TO RELATED APPLICATIONS

This application claims the benefit of U.S. Provisional Application Ser. No. 60/547,845 filed Feb. 26, 2004, the disclosure of which is hereby incorporated by reference in its entirety.

TECHNICAL FIELD

The present invention relates to vehicle battery state of charge improvement during the vehicle assembly process.

BACKGROUND OF THE INVENTION

Today's OEM Vehicle Batteries are manufactured to a specification describing performance, typically in Cold Cranking Amps (CCA) and Reserve Capacity (RC). A correlation to meeting these requirements can be defined as State of Charge (SOC) in terms of voltage, which can be related back to a percentage of original capacity. The battery manufacturer will deliver the battery to the vehicle manufacturer with at least a specified minimum percentage of SOC.

Vehicle Assembly Plant techniques vary for battery installation, and their internal processes can increase or decrease the SOC depending on engine run time, internal testing, and general practices by the work force, (e.g. practices related to auxiliary equipment or high electrical load vehicle equipment being left on while the vehicle is moving through the vehicle assembly process). Often, internal tests depend on the human factor for conducting them consistently. Consequently, there is frequently inconsistency, which means there may be a charge or discharge being experienced by the battery for the same vehicle and supposedly same assembly process.

Unfortunately this discharge condition can lead to premature battery drain leading to a vehicle being unable to start when it is first delivered to a dealer or perhaps even in an assembly plant staging lot. This is interpreted as a defective battery and ends up as early warranty, or what is commonly called zero-day warranty.

One way to improve initial Battery SOC is by increasing the engine RPM (revolutions per Minute) at Idle, (e.g. 650 RPM changed to 1000 RPM). However, this has raised some concern relative to a higher idle being somewhat of a shock to the customer, even if we utilize the programming capabilities of the vehicle computers to limit the engine RPM boost to only the very earliest part of vehicle life (vehicles are delivered to a customer with typically between 5 and 15 miles on the odometer). Even if the boosted idle is limited to the first 15 miles of vehicle life, the end customer may experience some displeasure for the first few miles of driving their newly purchased vehicle.

Another way to improve battery SOC is by overriding the RVC (Regulated Voltage Control) capabilities to command a maximum duty cycle of the alternator resulting in a maximized alternator output in terms of output voltage for the earliest part of the vehicle life. The alternator voltage regulator must be capable of receiving a PWM (Pulse Width Modulated) control signal. RVC is a technique used to optimize the charging of the battery based on a system that monitors battery SOC.

This invention is a unique method that provides at least minimized battery discharge relative to variable vehicle assembly practices, and potentially adds charge to all applications.

SUMMARY OF THE INVENTION

This invention uses a combination of both control features, RPM Idle Boost increase and RVC Duty Cycle override, early in the vehicle life to minimize the unwanted effects of higher RPM while achieving directionally correct Battery SOC improvement at the vehicle assembly plant. The method utilizes well-known programming techniques to add specific commands in the vehicle ECM (Engine Control Module) and/or BCM (Body Control Module) to control both engine RPM and RVC Duty Cycle. Which Control Module to use is based on the given architecture of a specific vehicle.

Each vehicle powertrain & battery combination will require testing or simulation to achieve the best combination of RPM Idle Boost increase and RVC Duty Cycle override for a given vehicle. The minimum required Idle Boost speed of the alternator is based on the output curve of the alternator. The minimum Idle Boost speed is chosen by determining at what speed the system provides a positive charge to the battery when the vehicle accessories are on and the voltage output of the alternator is forced at approximately 90% of maximum duty cycle.

DETAILED DESCRIPTION OF THE PREFERRED EMBODIEMENT

Figure 1:
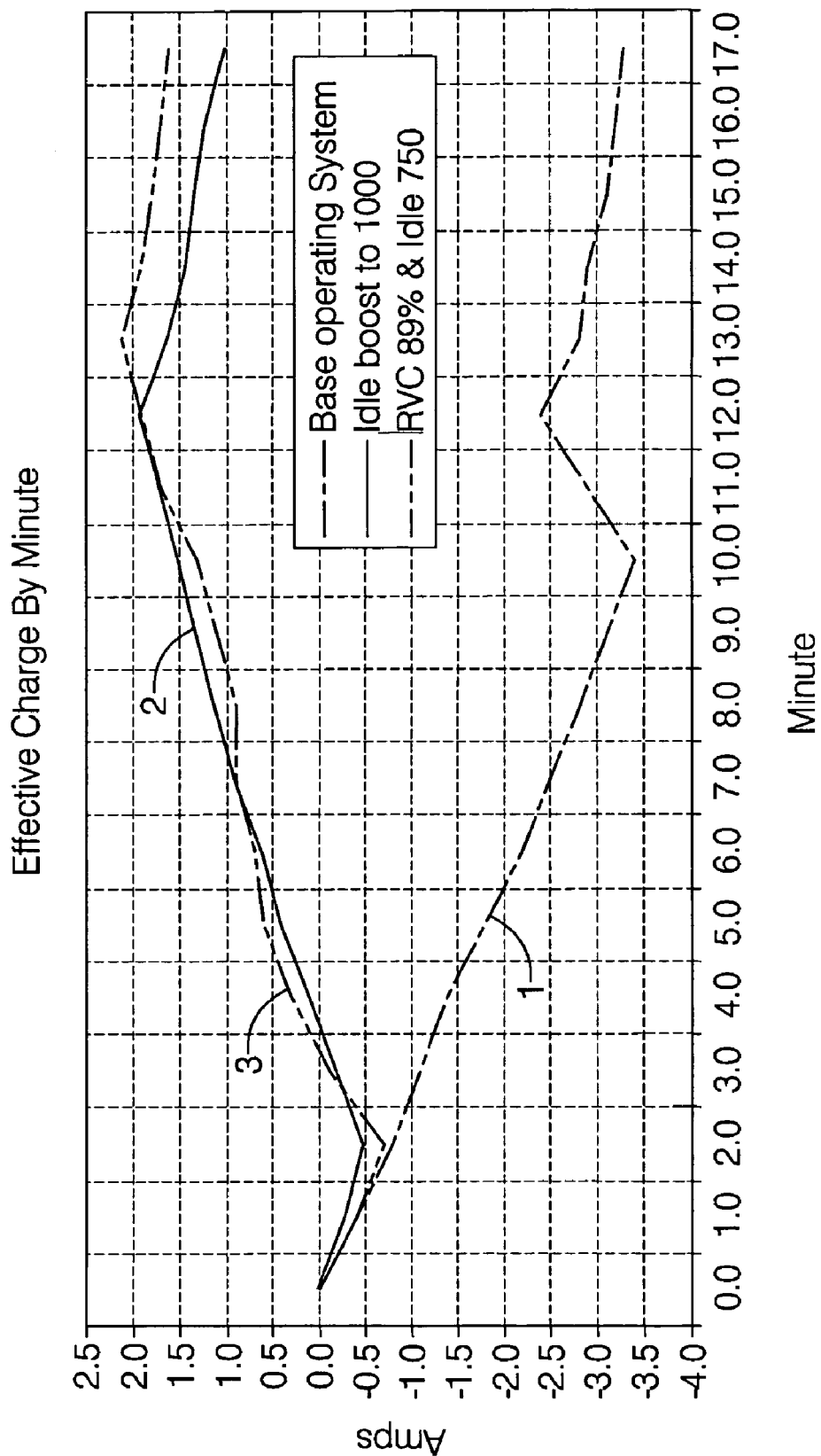
FIG. 1 is a graph showing the original condition and the results obtained by implementing the invention.

This invention uses a combination of control features, RPM Idle Boost increase and RVC Duty Cycle override, early in the vehicle life to minimize the unwanted effects of higher RPM while achieving directionally correct Battery SOC improvement at the vehicle assembly plant.

In order to minimize idle RPM boost while maintaining battery SOC, it is necessary to determine how far the Regulator Voltage Control Duty Cycle can be forced without causing a system error. Of course, the option of forcing a certain percentage of regulated voltage control output is only available on alternators where there is the ability to remotely force the RVC output to a desired output. Utilizing an actual vehicle and techniques well known to those skilled in the art, it was determined that forcing RVC Duty Cycle to 100% caused errors in the system. Further investigation revealed that RVC Duty Cycle could only be forced to approximately 90% for the given vehicle. Other engine-battery-vehicle-vehicle combinations may have a different value for maximum RVC Duty Cycle that can be determined using well-known techniques in the art.

It is also necessary to know how much discharge occurs at the various steps of the assembly process. This is done by auditing the in-plant practices during vehicle assembly and comparing the audit results with the stated procedures. From this comparison a standard offline audit can be developed which will serve as a benchmark for determining a standard charge/discharge curve that represents what happens to the battery SOC during vehicle assembly for a given engine-battery-vehicle combination.

Using standard programming techniques which are well known in the art, the control module for boosting engine idle RPM and the control module for controlling the RVC Duty Cycle for the alternator (these may be separate control modules or the same control module depending on the vehicle electrical architecture) can be programmed to provide the minimum necessary engine idle RPM boost in conjunction with the maximum allowable RVC Duty Cycle for a short period (about 15 miles) of the vehicle's early life.

Experimental Results

The basic preliminary procedure was to place an amp-hour meter inline with the battery in the vehicle and measure charge and discharge condition as a function of time through the process. Preliminary analysis revealed that the in-plant practices varied from the stated procedures. This variation is primarily due to the interpretation of the operator conducting internal functions, process, or test. This resulted in an unacceptable variation for actual audits in the plant which showed both charge & discharge conditions of the battery.

An offline audit was developed which allowed us to achieve repeatable audits. The following chart illustrates the off-line audit:

| Procedure | Load Cycle | Minute |
|---|---|---|
| Battery Hook up | 100% | 0.0 |
| Key on Engine off, Radio, HVAC @ 75 Auto, Lamps | 100% | 1.0 |
| Vehicle Run, Radio, HVAC @ 75 Auto, Lamps | 100% | 2.0 |
| Defog. On | 100% | 3.0 |
| Wipers, Door Locks, Mirror, Windows, Overhead | 1 cycle/accessory | 4.0–9 |
| 2500 RPM | NA | 10.0–12 |
| Key off/in, Door open (Interior lamps, headlight delay) | 100% | 13.0–17 |

The charge/discharge curve resulting from the offline audit procedure can be seen in FIG. 1, graph line 1.

At this point it was determined to try just boosting the engine idle RPM to 1000 RPM for the early life of the vehicle (approximately 15 miles) to measure the effect on the charge/discharge curve. Results from this activity can be seen in FIG. 1. This action took the system form a worst case 3.5 ampere hour discharge to a 1.5 ampere hour charge condition (see FIG. 1, graph line 2). However, as expected, a concern was raised by plant personnel concerning the high engine idle RPM (normal idle speed is 650 RPM) causing the operator off guard or displeasing the end customer due to drivability and/or noise issues.

The next step was to determine the maximum RVC Duty Cycle boost that could be maintained by the system without generating errors. In this particular case, it was determined that the RVC Duty Cycle could only be set to 89% of full output without generating errors.

The RVC Duty Cycle was set to 89% and engine idle RPM was boosted to 750 RPM. The results of this combination can be seen in FIG. 1, graph line 3. The overall charging was slightly improved over the idle boost to 1000 RPM alone, while the idle boost was decreased to 750 RPM, only 100 RPM over normal. This would be barley perceptible to the end customer, and would of course return to 650 RPM after the vehicle reached 15 miles on the odometer.

While the particular METHOD FOR IMPROVED BATTERY STATE OF CHARGE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

The invention claimed is:

1. A method for improving vehicle battery state-of-charge (SOC) during vehicle assembly, the method comprising:
   determining an available maximum percentage of regulated voltage control duty cycle output from an alternator of said vehicle; and
   determining a minimum idle boost speed necessary to provide a positive charge to said battery when said vehicle's accessories are in the "on" state during said vehicle assembly and said alternator is forced to provide said available maximum percentage of regulated voltage control duty cycle output.

2. The method of claim 1 wherein said determining an available maximum percentage of regulated voltage control duty cycle output from an alternator comprises the step of testing a specific engine-battery-vehicle combination to determine to what percentage of maximum the regulated voltage control duty cycle output can be forced before a system error occurs.

3. The method of claim 1 wherein said determining a minimum idle boost speed necessary to provide a positive charge comprises the step of auditing the assembly practices for said specific engine-battery-vehicle combination to determine the charge/discharge curve for the specific combination.

4. The method of claim 3 wherein said determining a minimum idle boost speed necessary to provide a positive charge further comprises deriving a standard charge/discharge curve from the data collected during the audit.

5. The method of claim 1 further comprising:
   programming an appropriate control module of said vehicle to force said available maximum percentage of regulated voltage control duty cycle output from an alternator of said vehicle for an early part of the life of said vehicle.

6. The method of claim 5 further comprising:
   programming an appropriate control module of said vehicle to set said minimum idle boost speed determined in said determining a minimum idle boost speed step for said early part of the life of said vehicle.

7. The method of claim 6 wherein said early part of the life of the vehicle is about 15 miles.

8. The method of claim 5 wherein said early part of the life of the vehicle is about 15 miles.

* * * * *